Figure 1:
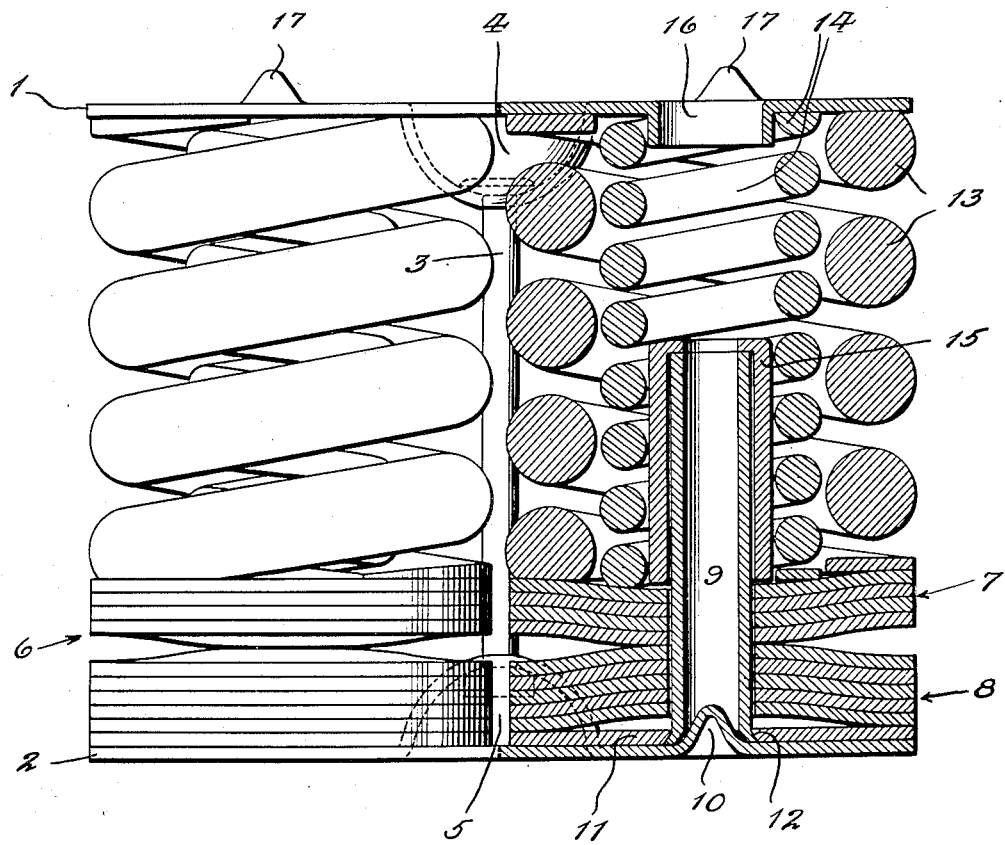

Jan. 12, 1932.  C. HANKINS  1,840,506
SPRING MECHANISM
Filed Jan. 24, 1925  7 Sheets-Sheet 1

Inventor
Cyrus Hankins
By
His Attorney

Jan. 12, 1932.  C. HANKINS  1,840,506
SPRING MECHANISM
Filed Jan. 24, 1925    7 Sheets-Sheet 2
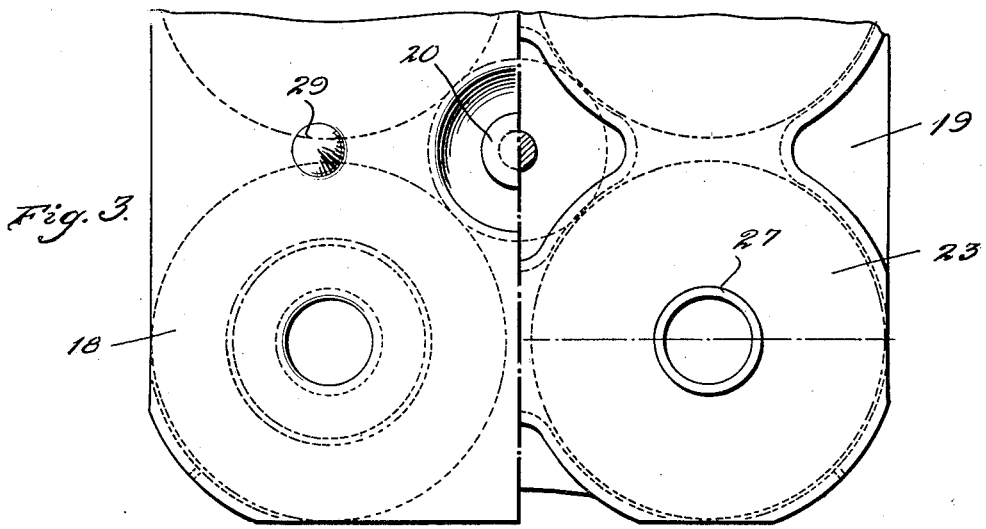
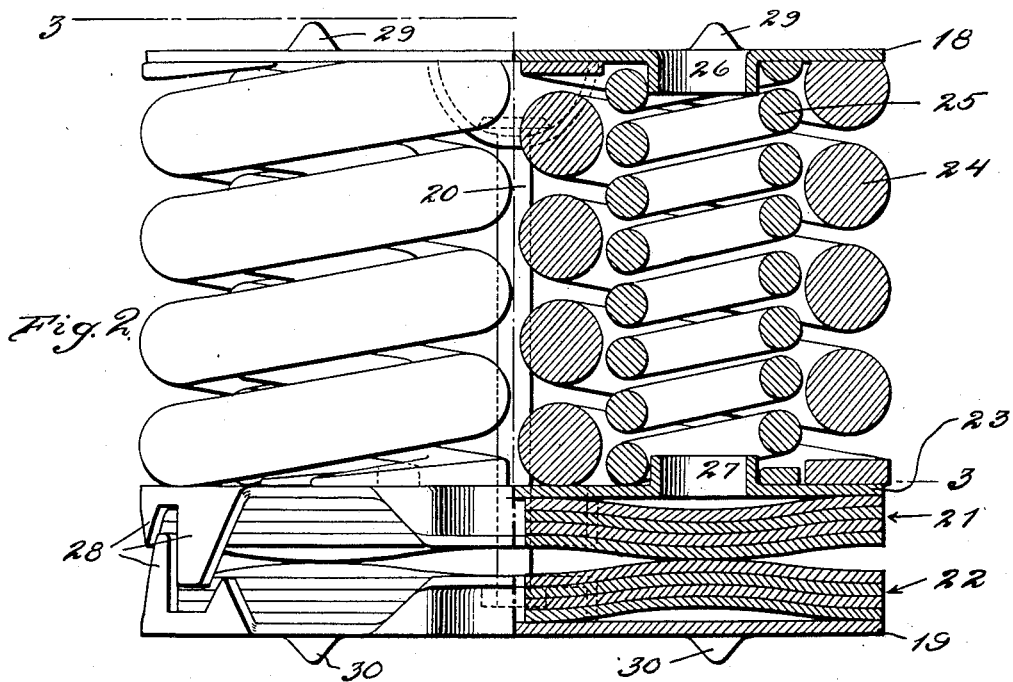
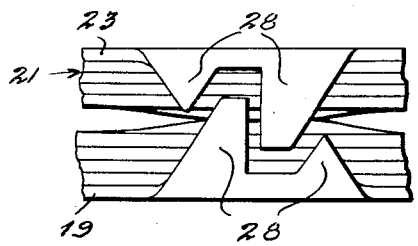
Inventor
Cyrus Hankins
By
his Attorney Jan. 12, 1932.　　　　C. HANKINS　　　1,840,506
SPRING MECHANISM
Filed Jan. 24, 1925　　7 Sheets-Sheet 3
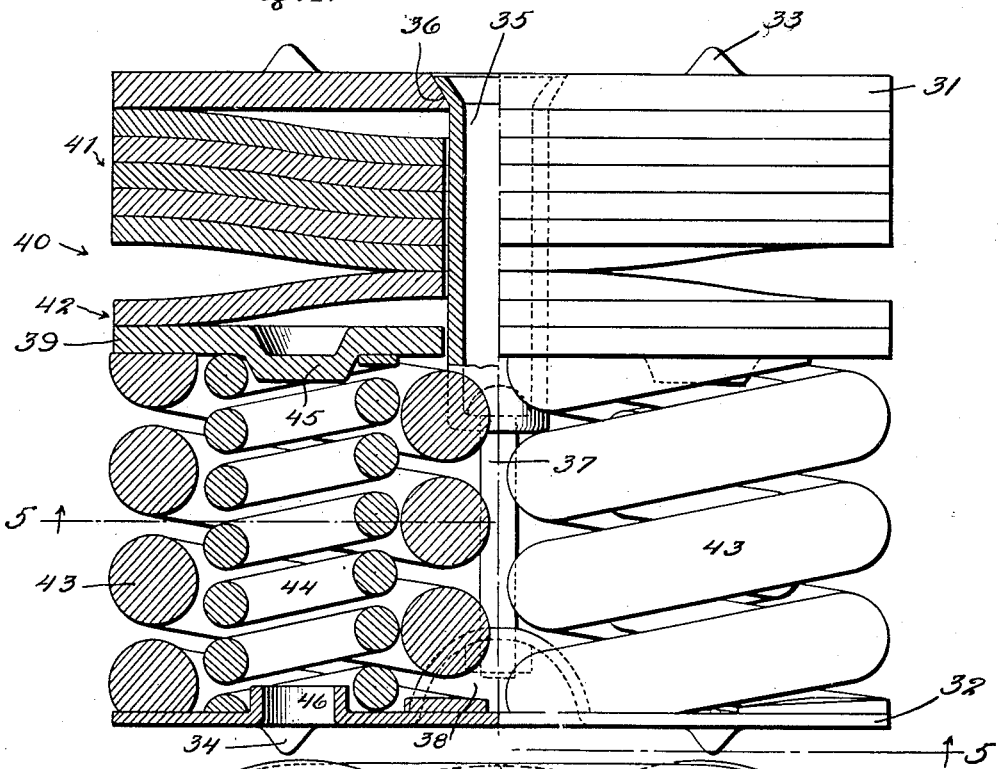
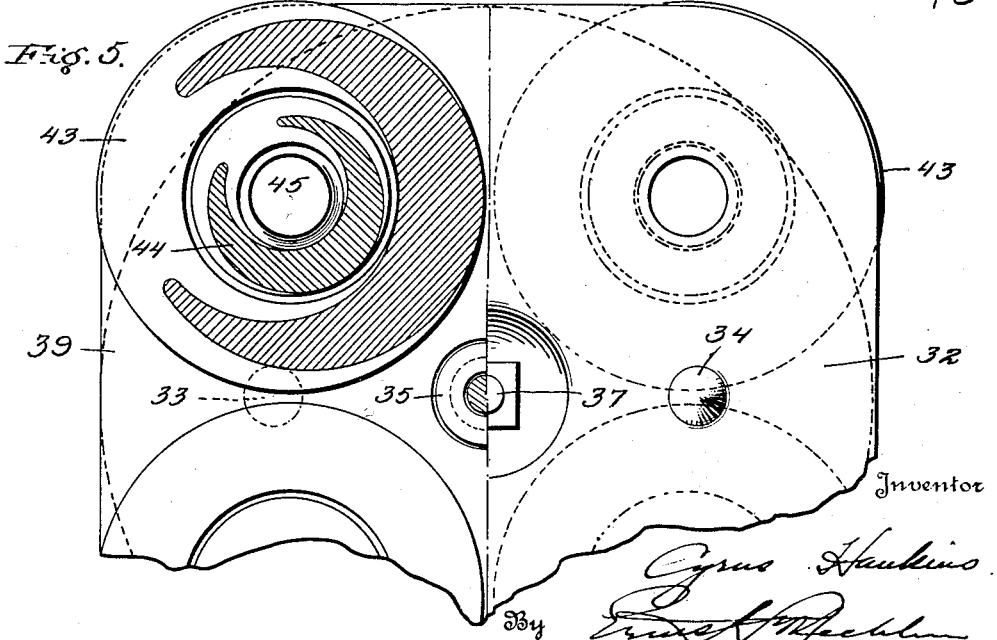

Jan. 12, 1932.     C. HANKINS     1,840,506
SPRING MECHANISM
Filed Jan. 24, 1925     7 Sheets-Sheet 4
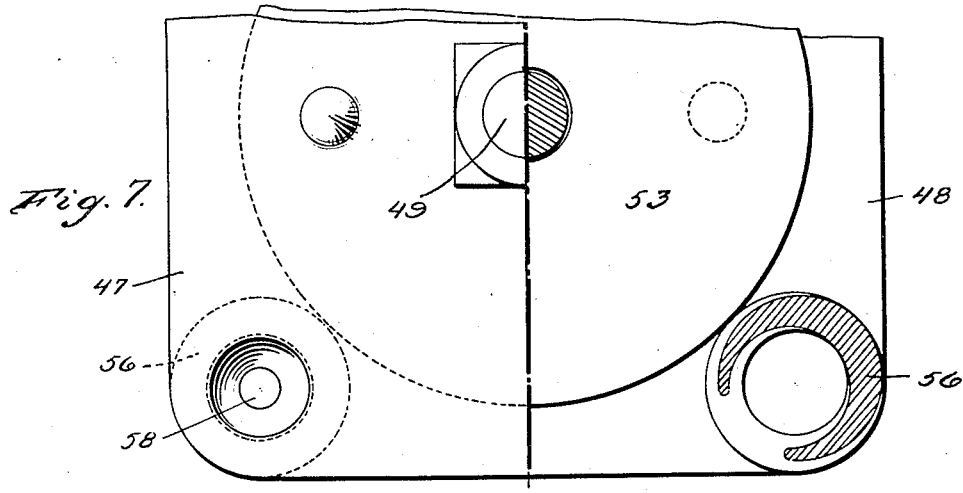
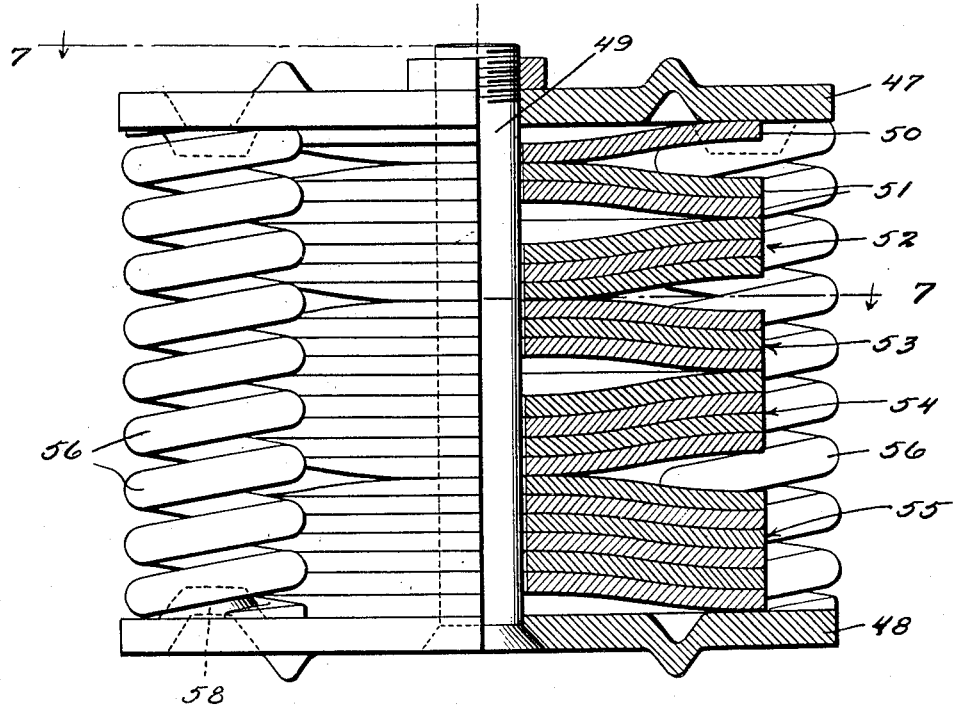

Jan. 12, 1932. C. HANKINS 1,840,506
SPRING MECHANISM
Filed Jan. 24, 1925 7 Sheets-Sheet 5

Jan. 12, 1932.  C. HANKINS  1,840,506
SPRING MECHANISM
Filed Jan. 24, 1925   7 Sheets-Sheet 6

Inventor
Cyrus Hankins
By
his Attorney

Jan. 12, 1932. C. HANKINS 1,840,506
SPRING MECHANISM
Filed Jan. 24, 1925 7 Sheets-Sheet 7

Inventor
Cyrus Hankins
By his Attorney

Patented Jan. 12, 1932

1,840,506

UNITED STATES PATENT OFFICE

CYRUS HANKINS, OF BALTIMORE, MARYLAND, ASSIGNOR, BY MESNE ASSIGNMENTS, TO T. H. SYMINGTON AND SON, INC., OF BALTIMORE, MARYLAND, A CORPORATION OF MARYLAND

SPRING MECHANISM

Application filed January 24, 1925. Serial No. 4,536.

The invention relates to springs for use in connection with the trucks of railway or other cars.

The primary object of the invention, generally stated, is to provide a spring unit or assembly adapted for location within the window or bolster opening of a truck side frame in the usual manner and formed or arranged as a combination of disk or frictional resistance and coil or live springs which will coact to give the proper resilience.

It is well known that if coil springs alone be employed the strains are not uniformly distributed owing to variations in the individual springs in regard to strength, a condition which results in bringing undue strain upon certain portions of the areas of the elements engaged with the springs. Even though the utmost care be exercised in the endeavor to make or select springs having the same compressibility or tension there are always certain variations notwithstanding the fact that the springs may all be formed from the same stock, wound upon the same or similar mandrels, given the same length and tempered by the same process. When a plurality of springs are used and such variations exist, it is obvious that the maximum strength comes upon those areas engaging the stiffest springs. Although the springs might be of substantially the same strength when newly installed, their conditions may change as the result of service and unequal strains be consequently brought upon the parts, such as the body bolster, spring plank and the like engaged therewith. It is also well known that plate springs which have been utilized as truck springs in the past have not proved satisfactory, although such springs are not subject to such extensive variations in manufacture as coil springs.

As a further consideration, the present invention is concerned with the problem presented by the so-called inertial loads, that is, the sprung weight of the car and/or its lading, when under momentum. These loads may be occasioned by irregularities in the track and may attain such a degree of severity as to drive the helical springs solid in cases where the latter are the sole means of spring suspension. Accordingly, I propose a truck spring nest composed of live or helical springs and frictional resistance means which operate in unison, the nest formation being of a size that may be easily positioned within the window opening of a truck side frame. In this arrangement, the helical springs possess sufficient capacity to either sustain, or assist in sustaining, the static load of the car and/or its lading, while the frictional resistance means counteract the harmful action that would otherwise obtain due to the inertial loads, owing to their inherent capacity for energy absorption.

In the present invention, there is also contemplated the employment of frictional resistance springs of novel construction and arrangement either alone or in combination with coil or live springs, the former having a period of vibration and being therefore capable of providing or insuring resilience even though the latter lose their elasticity and become inert or dead, the two kinds of springs being so associated and arranged that they may be readily placed within the window opening of a truck side frame, either as a replacement for a standard spring group or as a part of new construction.

Another object of the invention, more specifically stated, is to provide a truck spring unit in which there may be employed a plurality of coil springs in combination with a single set or a corresponding number of sets of frictional resistance springs arranged either in axial, concentric or circumferential relation.

A still further object of the invention is the provision of a spring unit embodying frictional resistance springs and provided with means engaging the springs thereby preventing them from having any lateral movement, or displacement during service.

An additional object of the invention is to provide a spring unit embodying plate or disk springs so arranged that the adjacent elements of certain groups will have their central portions in direct engagement, while the adjacent elements of certain other groups will have their outer portions in direct engagement or contact.

A further object is to provide a spring suspension for railway cars comprising an assembly of frictional resistance and helical springs which operate in unison with the bolster load, the disposition of the vertical center line of both types of springs radially from the vertical center line of the window opening of an associated side frame being limited by the marginal outline of the spring seat portion of said frame.

Figure 9:
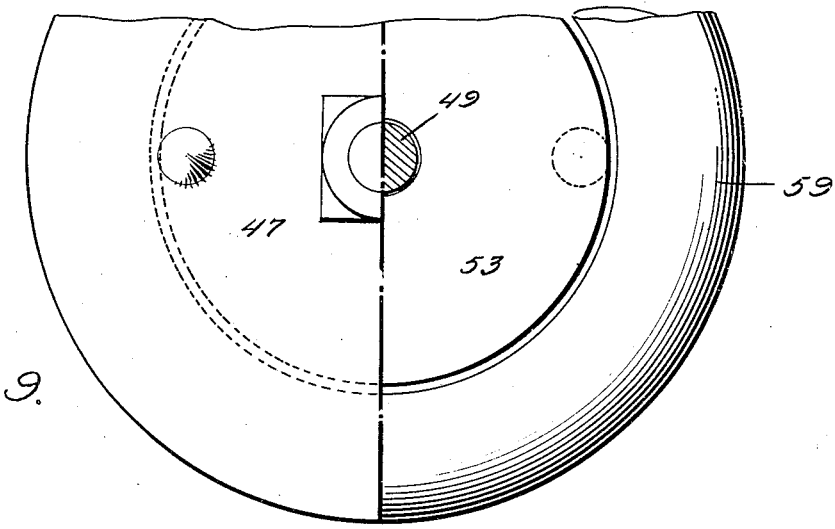
Figure 8:
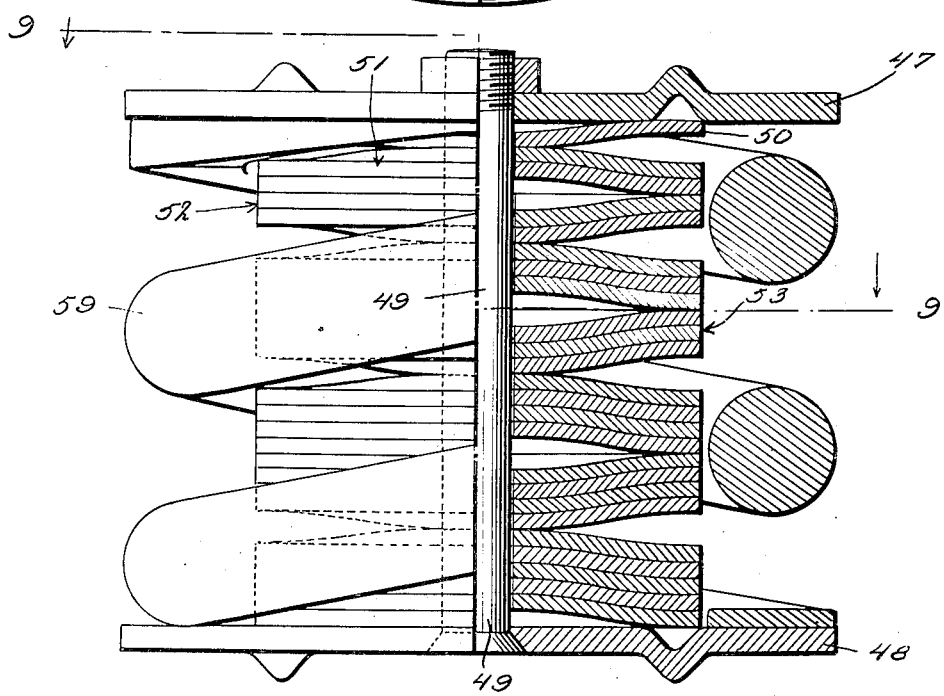
Figure 11:
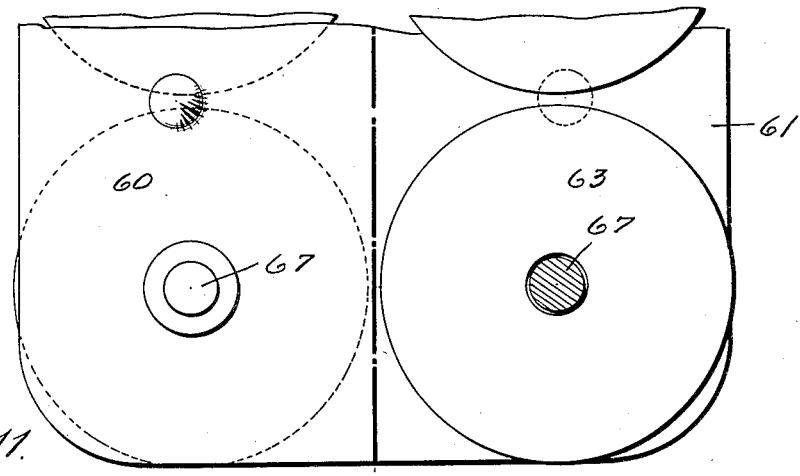
Figure 10:
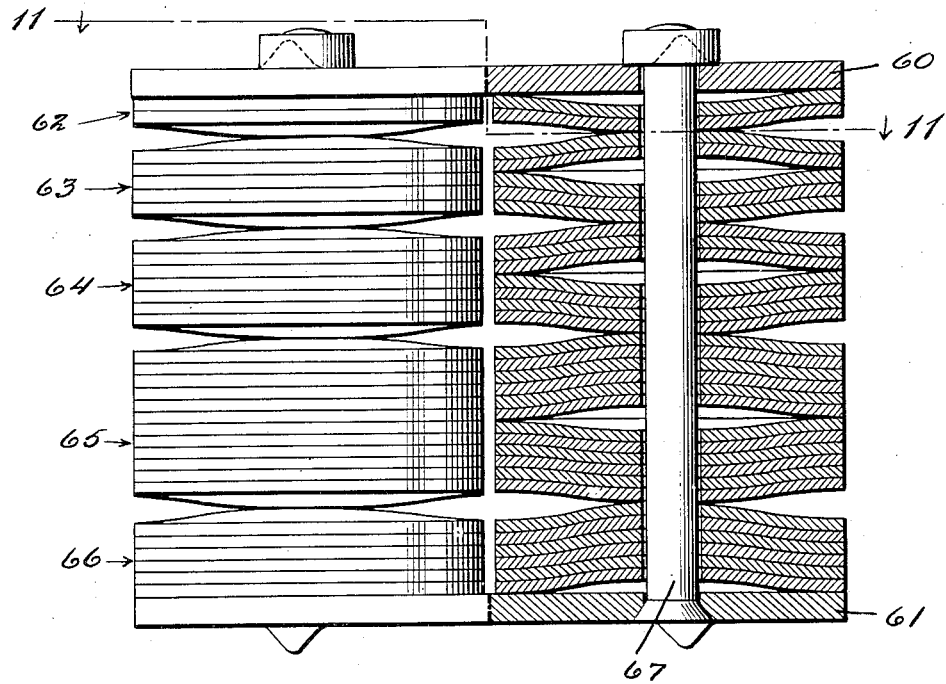
Figure 12:
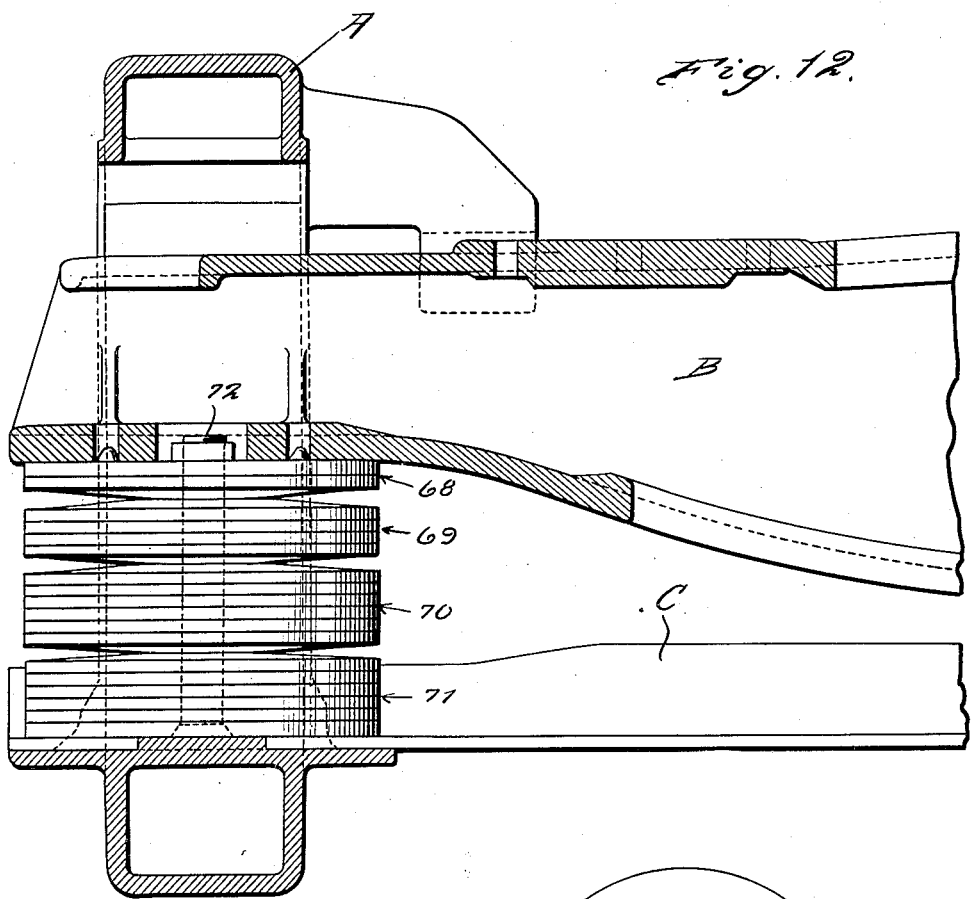
Figure 13:
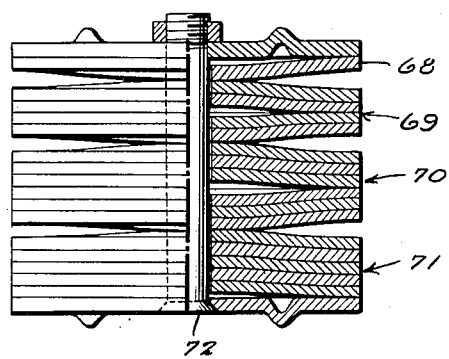
Figure 14:
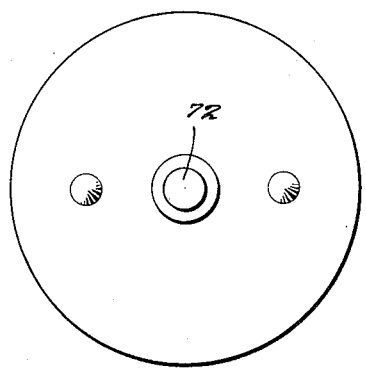

To the attainment of the foregoing and other objects and advantages, the invention may consist in the construction, arrangement and combination to be hereinafter more fully described and claimed, and illustrated in the accompanying drawings in which:

Figure 1 is a side elevation of a spring unit constructed in accordance with the invention, a portion being shown in section, this view illustrating one form embodying sets of plate or disk springs and coil springs arranged in axial relation, Figure 2 is a similar view of a modified form provided with different means for holding the plate or disk springs against lateral displacement, Figure 2a is a fragmentary detail elevation, Figure 3 is a view taken on the line 3—3 of Figure 2 showing a partial plan view of the unit and a partial plan view of the member engaged by the lower ends of the coil springs, Figure 4 is a view partly in elevation and partly in vertical section showing another variation in which a plurality of groups of coil springs are used in conjunction with a single set of disk springs and arranged in circular series with respect to the axis thereof, Figure 5 is a view taken on the line 5—5 of Figure 4 showing a partial plan view of the bottom of the unit and a section through one part thereof, Figure 6 is a view, half in elevation and half in vertical section showing a unit embodying a plurality of sets of plate or disk springs arranged in concentric relation, and a plurality of coil springs arranged circumferentially with respect thereto, Figure 7 is a view on the line 7—7 of Figure 6 showing a partial plan and partial section, Figure 8 is a partial side elevation and partial vertical section through another modification embodying a single set formed as a plurality of groups of coaxial disk springs together with a single coil spring arranged concentrically thereof, Figure 9 is a view on the line 9—9 of Figure 8 showing a partial plan and a partial cross section, Figure 10 is an elevation, partly in section, of a unit embodying a plurality of sets of plate or disk springs arranged or located side by side, Figure 11 is a view taken on the line 11—11 of Figure 10 showing a partial plan and a partial cross section through the unit, Figure 12 is a vertical cross section through a portion of a truck showing the manner in which all the spring units may be mounted and further illustrating another modification, Figure 13 is a view partly in side elevation and partly in vertical section showing the unit in detail, Figure 14 is a plan view.

Referring to the drawings in detail, I have shown, in Figure 1, a form of spring unit embodying cap and bed plates 1 and 2 respectively, connected to be incapable of relative movement in one direction as for instance by means of a tie bolt or the like 3 passing through cup-like or other equivalent depressed portions 4 and 5 formed centrally of the cap and bed plates respectively, the arrangement being such that the cap and bed plates may move toward each other upon compression of the spring means to be described.

In this instance the spring means may consist of a plurality of sets 6 of plate or disk springs, each set consisting of a pair of groups 7 and 8 having any desired number of plates or disks, with those of one group oppositely bowed with respect to those of the adjacent group, the adjacent plates or disks in each group directly contacting at their central portions with the peripheral portions spaced apart. In order that these groups of each set may be held in proper position and prevented from displacement, I may provide a retaining element 9 extending centrally through the groups 7 and 8 and held to the bed plate in any desired manner such as for instance that disclosed in Figure 1 which shows the bed plate as formed with an upward projection 10 extending within the element 9. The lowermost plate or disk of the group 8 preferably engages upon a flat disk or washer 11 lying upon the bed plate and having a flared or tapered opening 12 which receives the lower end of the retaining element 9, this lower end being upset outwardly or flared to fit within the opening 12 so that the member 9 will be incapable of longitudinal movement outwardly with respect to the bed plate.

In conjunction with the sets of plate or disk springs I employ coil springs 13 interposed between the cap 1 and the uppermost spring element in the group 7. I also prefer to use other coil springs 14 which may be considerably lighter than the springs 13 and which are disposed therein. To center the coil springs I may provide a sleeve 15 telescoped onto each retaining element 9 and encircled by the springs 14. The upper end of each spring 14 may be held properly centered by providing a circular downturned or downwardly extending flange or other equivalent projection 16 on the cap plate fitting within each spring 14.

The entire unit is assembled with respect to a truck in the usual manner and is of course mounted within the window opening in engagement with the truck bolster and spring plank as is well known. If desired the holding means may consist of upstanding projections 17 on the cap plate adapted to fit within recesses or holes in the truck bolster. The details of mounting are so well known that an explanation is really unnecessary though in Figure 12 I have illustrated a portion of a truck A equipped with a spring unit of a different type, to be described, interposed in the same manner between the truck bolster B and the spring plank C.

When in service the operation of this unit is as follows:

The spring disks 7 and 8 are preferably so proportioned that the initial resistance of the same will be equal to the total resistance of the combined coil springs so that in ordinary operation the coil springs are adapted to provide the usual flexible connection between the truck and bolster. When, however, the truck is subjected to excessive loads caused by swaying of the car due to a low point in the track which would normally result in closing the coil springs, the plates or disks 7 and 8 are brought into operation and the excessive jars and shocks on the truck side frame avoided. It will of course be apparent that the relationship or capacities of the respective groups of springs may be altered as desired so that the springs may operate either in unison or alternatively, as stated.

In Figures 2, 2a and 3 I have illustrated a modification in which the cap and bed plates 18 and 19, respectively, may be held against relative movement away from each other by a tie bolt 20 in substantially the same manner as above described. However, in this instance, the retaining means for the groups of oppositely bowed plate or disk springs 21 and 22, corresponding to the groups 7 and 8, is of different form inasmuch as I have shown a plate device or member 23 of the same size and shape as the bed plate 19 and resting upon the uppermost leaves or plates in all the groups 21, this plate member being apertured for sliding engagement upon the tie bolt and serving as an abutment for one end of the coil springs 24 which correspond to the springs 13 and within which are located smaller and lighter coil springs 25 similar to the springs 14 and held centered as for instance by means of projections 26 and 27 formed respectively on the cap plate 18 and plate member 23.

In order that lateral displacement of the spring elements in the groups 21 and 22 may be prevented, the bed plate 19 and the plate member 23 may be formed with interfitting lateral projections 28 which extend outwardly of the plate or disk springs but which are so arranged as to permit movement of the plate member 23 toward the bed plate 19 when the springs in the groups 21 and 22 are compressed. This form will of course operate in the same manner as the first described form and may be held in place in any desired or preferred manner as for instance by means of projections 29 and 30 formed on the cap plate 18 and bed plate 19 respectively and adapted to fit within recesses or openings in the bolster and spring plank.

Referring to Figures 4 and 5 it will be observed that substantially the same general idea has been carried out, but that there is only a single set of plate or disk springs employed in conjunction with a plurality of sets of coil springs. Referring to these figures in detail, the numerals 31 and 32 designate the cap and bed plates which may be provided with projections 33 and 34 for effecting the securing thereof with respect to the truck. For preventing separation of the cap and bed plate beyond a certain predetermined extent, use may be made of a tubular retaining element 35 located centrally of the cap plate 31 and slidably engaged through a central opening 36 therein, the upper end being outwardly flared for contact with the correspondingly tapered wall of the opening 36 in order to act as a stop. A tie bolt 37 may be connected with the inner end of the tubular member 35 and with a cup-like depressed member or portion 38 formed centrally of the bed plate 32.

Located between the cap and bed plates and slidable upon the tubular member 35 is a follower or abutment plate member 39 preferably of the same contour as the cap plate. Between the cap plate and follower or abutment plate 39 is a set of plate or disk springs indicated generally at 40 and including a group 41 of any desired number of plates or disks bowed in one direction, and further including one or more plates or disks 42 bowed in the opposite direction. In the particular embodiment shown there is only one plate or disk 42 and it has its central portion engaging directly with the central portion of the lowermost one of the plates or disks in the group 41, with its outer edge bearing against the follower or abutment plate 39. The uppermost one of the plates or disks in the group 41 has its outer portion bearing directly against the underside of the cap plate 31.

Located between the follower or abutment plate 39 and the bed plate 32 are sets of coil springs, each set including a relatively heavy outer coil spring 43 and a relatively light coil spring 44 therein, the spring 44 serving to center the spring 43 and being itself centered by means of oppositely extending projections 45 and 46 formed respectively on the follower or abutment plate 39 and the bed plate 32.

In all of the above described forms the coil springs are represented as having abutting relation to the plate or disk springs, an arrangement which is capable of variation within the scope of the invention as I may prefer to combine the plate or disk springs and the coil springs in a somewhat different manner as disclosed in Figures 6 to 9 inclusive.

Referring to these figures in detail, I have shown cap and bed plates 47 and 48 connected for limited relative movement by means of a slidable tie bolt or the like 49 which passes through a plurality of groups of plate or disk springs 50, 51, 52, 53, 54 and 55. The disks or plates in the successive groups are oppositely bowed with the central portions of the springs in certain adjacent groups in direct contact and with the outer portions of the adjacent springs of the other successive groups in direct contact. The number of springs in each group may, if preferred, be progressively increased as clearly indicated though such is optional as a different arrangement could be provided if preferred for any reason.

In Figures 6 and 7 I have shown a plurality of coil springs 56 arranged outwardly of the entire set of plate or disk springs or in circumferential series with respect thereto, the coil springs being held against displacement as for instance by means of oppositely extending projections 57 and 58 on the cap and bed plates respectively, while in Figures 8 and 9 I have shown a single coil spring 59 arranged in concentric relation to the entire set of plate or disk springs and abutting directly against the cap and bed plates.

It will be observed that, in the modifications illustrated in Figs. 6 to 9, inclusive, the load is applied directly to the friction and live springs, or, in other words, there is a parallel transfer of the load through the spring assembly, as contrasted with the series arrangement illustrated in Figs. 1 to 5, inclusive. In the parallel arrangement, the live springs preferably embody sufficient capacity to either carry, or assist in carrying, the static load, with the frictional resistance springs acting to absorb the shocks of the inertial loads occasioned by the sprung weight of the car and/or its lading, when under momentum. An arrangement of the foregoing character possesses sufficient resiliency to insure easy riding qualities for a car, but absolutely prevents the application of harmful shocks to the side frame, rails and roadbed.

It will be obvious that, under these conditions, the live or helical springs and the friction springs would be characterized by different periods of vibration which would necessarily result in a mutual damping action.

When used in side frames designed for use with cars of large capacity such as the 90 ton cars of the N. & W. Railway, the spring unit may if desired be composed entirely of disk springs as shown in Figures 10 and 11 wherein I have disclosed cap and bed plates 60 and 61 between which are arranged sets of plate or disk springs each including a plurality of groups 62, 63, 64, 65 and 66 with those in each group oppositely bowed and with the various groups contacting as above described. For holding these sets of springs against displacement and at the same time limiting separating movement of the cap and bed plates use may be made of tie bolts 67 passing through the cap and bed plates and centrally through the sets of springs.

If for any reason it should be desired to avoid the employment of the plurality of sets of plate or disk springs shown in Figures 10 and 11, a single set might be used as shown in Figures 12, 13 and 14, the arrangement of the groups 68, 69, 70 and 71 being substantially the same. In this modification as well as in every other form described it will be observed that the adjacent disks or plates in the adjacent groups will have their central portions in direct contact without the interposition of any buffers, spacing elements or the like.

From the foregoing description and a study of the drawings, it will be apparent that I have thus provided a spring unit designed for use in the same manner as and to replace an ordinary type of unit, but which on account of the particular and peculiar arrangement and combination of parts will insure the proper yielding action under any and all service conditions, the forms employing coil springs in combination with plate or disk springs being particularly efficient inasmuch as the plate or disk springs will prevent deadness even though the coil springs should lose their elasticity. Another feature of advantage to be noted is that in all forms, regardless of whether coil springs be used or not, the arrangement of the successive groups of plate or disk springs in every set, regardless of whether one or more sets be provided, is such that at least two of the plates or disks will contact adjacent their centers and be spaced apart at their marginal edges, though in the practical carrying out of the invention where a plurality of groups are used with a plurality of plates or disks in each group, it is obvious that the adjacent plates of the alternate successive groups will have their central portions contacting with the peripheral portions spaced apart, the adjacent plates of the other alternate successive groups having their peripheral portions contacting.

While I have shown and described several preferred embodiments of the invention and have indicated the employment of the unit as mounted in the window opening of a truck, it should of course be understood that other arrangements and detailed constructions may be resorted to if preferred and it is of course apparent that if desired the size of the unit may be reduced and the structure otherwise modified so as to permit its employment in connection with trucks of the pedestal type in which the springs are mounted upon or above the journal boxes, all these and many other variations and possible modifications being contemplated as being within the spirit of the invention as set forth in the claims hereunto appended.

Having thus described the invention, I claim:

1. A spring suspension for railway cars, comprising a nest of freely movable or live springs and one or more frictional resistance springs acting in unison.

2. A spring suspension for railway cars, comprising top and bottom follower plates, a plurality of freely movable helical springs interposed between said plates and distributed about the area thereof and one or more frictional resistance springs, all of said springs acting in unison.

3. A spring suspension for railway cars having a predetermined maximum static load comprising a freely movable spring capable of sustaining said static load and a frictional resistance spring for absorbing inertial loads, the said springs acting in unison.

4. A truck spring assembly comprising in combination, resilient means having surfaces adapted for a rubbing action relative to each other, and live spring means operating in unison therewith, said means being located adjacent each other for the direct subjection of each to the bolster load and the disposition of the vertical center lines of both of said means radially from the vertical center line of the window opening of an associated side frame being limited by the marginal outline of the spring seat portion of said frame, said surfaces being substantially transversely disposed with respect to the direction of the load and the application of the load to said resilient means causing said rubbing action.

5. A truck spring nest for railway cars comprising in combination, spring means having surfaces adapted for a rubbing action relative to each other, and live spring means operating in unison with said first named spring means, said means being located adjacent each other for the direct subjection of each to the bolster load and the disposition of the vertical center lines of both of said means radially from the vertical center line of the window opening of an associated side frame being limited by the marginal outline of the spring seat portion of said frame, said surfaces being angularly disposed to the direction of the load and the application of the load to said first named spring means causing said rubbing action.

6. In a railway truck, the combination of a side frame having compression and tension members spaced at intermediate portions thereof by bolster guide columns leaving a window opening therebetween, the tension member beneath the window opening being formed with a spring seating portion, and a spring assembly located in said window opening beneath the bolster comprising spring means having surfaces adapted for a rubbing action upon each other, and live spring means operating in unison with said first named spring means, said means operating under the action of the bolster load and the disposition of the vertical center lines of both of said means radially from the vertical center line of the window opening being limited by the marginal outline of the spring seat portion of said frame, said surfaces being angularly disposed with respect to the direction of said load and the application of the load to said first named spring means causing said rubbing action.

7. A spring nest for railway cars comprising in combination, spring means having surfaces adapted for a rubbing action relative to each other, and live spring means located beside said first named spring means for the direct subjection of each of said means to the bolster load, the disposition of the vertical center lines of both of said means radially from the vertical center line of the window opening of an associated truck side frame being limited by the marginal outline of the spring seat portion of said frame, said surfaces being angularly disposed to the direction of said load and the application of the load to said first named spring means causing said rubbing action.

8. A truck spring assembly comprising in combination, spring means having surfaces adapted for a rubbing action relative to each other, and live spring means operating in unison with a said first named spring means, said means being located adjacent each other for the direct subjection of each to the bolster load and said live spring means being adapted to assist in sustaining the static load, the disposition of the vertical center lines of both of said means radially from the vertical center line of the window opening of an associated truck side frame being limited by the marginal outline of the spring seat portion of said frame, the application of the load to said first named spring means causing said rubbing action.

9. A spring nest for railway cars comprising in combination, spring means having surfaces adapted for a rubbing action relative to each other, and live spring means having substantially the same height as said first named means when in operative position, said means being located adjacent each other for the direct subjection of each to the bolster load and the disposition of the vertical center lines of both of said means radially from the vertical center line of the window opening of an associated side frame being limited by the marginal outline of the spring seat portion of said frame, said surfaces being angularly disposed to the direction of the load and the application of the load to said first named spring means causing said rubbing action.

10. A car truck spring consisting of the combination of a friction producing spring means and a plurality of helical springs arranged in spaced relation thereto, the disposition of the vertical center lines of both of said means radially from the vertical center line of the window opening of an associated truck side frame being limited by the marginal outline of the spring seat portion of said frame, and means common to said spring means and springs for transferring the bolster load thereto.

11. In a cushioning assembly, the combination of superposed spring plates angularly disposed to the direction of the applied load, and helical spring means surrounding the same.

12. In a truck spring unit, the combination of a resilient, friction producing means and helical springs disposed on opposite sides of said means, the vertical axes of said means and springs lying in the same plane.

13. In a cushioning assembly, the combination of friction producing spring means, and a plurality of helical springs located outwardly thereof in spaced relation thereto and disposed substantially in a square formation.

14. A car truck spring consisting of the combination of a friction producing spring means, a plurality of helical springs arranged in spaced relation thereto, top and bottom cap plates common to said means and springs, and tie means connecting said caps and holding said means and springs in assembled relation.

15. A spring suspension for railway cars comprising a nest of freely movable or live springs and one or more frictional resistance springs acting in unison, the disposition of the vertical axes of all of said springs radially from the vertical center line of the window opening of an associated side frame being limited by the marginal outline of the spring seat portion of said frame.

16. A spring nest for railway cars comprising in combination, spring means composed of a plurality of superposed, curved plate members, and helical spring means operating in unison therewith, said means being located adjacent each other for the direct subjection of each to the bolster load and the disposition of the vertical axes of all of said springs radially from the vertical center line of the window opening of an associated side frame being limited by the marginal outline of the spring seat portion of said frame, the application of the load to said spring means causing a rubbing action between said plate members.

17. A spring nest for a railway truck having spring means comprising a plurality of superposed elements angularly disposed to the direction of the bolster load and having surfaces adapted for a relative rubbing action, and helical spring means operating in unison therewith, said spring means and helical spring means having different periods of vibration and the disposition of the vertical center lines of said spring means and helical spring means radially from the vertical center line of the window opening of an associated side frame being limited by the marginal outline of the spring seat portion of said frame.

18. A spring nest for a railway truck having spring means comprising one or more groups of superposed load carrying elements having surfaces in direct contact with each other and being angularly disposed to the direction of the bolster load, and helical spring means operating in unison therewith, said spring means and helical spring means having different periods of vibration and the disposition of the vertical center lines of said spring means and helical spring means radially from the vertical center line of the window opening of an associated side frame being limited by the marginal outline of the spring seat portion of said frame.

In testimony whereof I affix my signature.

CYRUS HANKINS.